(12) United States Patent
Tunzini et al.

(10) Patent No.: US 8,659,196 B2
(45) Date of Patent: Feb. 25, 2014

(54) POWER SUPPLY DEVICE FOR MOTOR VEHICLE ALTERNATOR AND ALTERNATOR EMPLOYING SUCH DEVICE

(75) Inventors: Marc Tunzini, Versailles (FR); Michaël Chemin, Festigny (FR)

(73) Assignee: Valeo Equipements Electriques Moteur, Creteil Cedex (FR)

( * ) Notice: Subject to any disclaimer, the term of this patent is extended or adjusted under 35 U.S.C. 154(b) by 872 days.

(21) Appl. No.: 12/668,997

(22) PCT Filed: May 27, 2008

(86) PCT No.: PCT/FR2008/050912
§ 371 (c)(1),
(2), (4) Date: May 27, 2010

(87) PCT Pub. No.: WO2009/019344
PCT Pub. Date: Feb. 12, 2009

(65) Prior Publication Data
US 2010/0295519 A1   Nov. 25, 2010

(30) Foreign Application Priority Data
Jul. 18, 2007  (FR) ..................... 07 56575

(51) Int. Cl.
*H02K 11/00* (2006.01)
*H02K 11/04* (2006.01)
*H02K 1/00* (2006.01)
*H02P 9/00* (2006.01)

(52) U.S. Cl.
USPC .......... 310/68 R; 310/179; 310/68 D; 322/90; 322/44

(58) Field of Classification Search
USPC .................. 322/89, 44, 59, 90; 318/497, 701; 310/200, 68 E, 179, 180, 68 R, 68 D
See application file for complete search history.

(56) References Cited

U.S. PATENT DOCUMENTS

| 4,339,704 | A |   | 7/1982 | McSparran et al. |
|---|---|---|---|---|
| 4,456,870 | A | * | 6/1984 | Rodari ............................ 322/29 |
| 4,751,448 | A | * | 6/1988 | Auinger ........................ 318/773 |
| 5,418,436 | A | * | 5/1995 | Apuzzo ......................... 318/497 |
| 5,449,962 | A | * | 9/1995 | Shichijyo et al. .............. 310/184 |
| 6,124,702 | A | * | 9/2000 | Pinkerton et al. ............... 322/90 |
| 6,366,060 | B1 | * | 4/2002 | Ely et al. .......................... 322/25 |
| 6,831,430 | B2 | * | 12/2004 | Edelson ................... 318/400.01 |
| 7,075,265 | B2 | * | 7/2006 | Edelson ......................... 318/801 |
| 7,126,298 | B2 | * | 10/2006 | Edelson ......................... 318/380 |
| 7,928,683 | B2 | * | 4/2011 | Edelson ......................... 318/632 |
| 7,989,996 | B2 | * | 8/2011 | Wolf et al. ................... 310/68 D |
| 2002/0101122 | A1 | * | 8/2002 | Haines et al. ............... 310/68 E |
| 2006/0273766 | A1 | * | 12/2006 | Kawamura ..................... 322/46 |
| 2008/0012538 | A1 | * | 1/2008 | Stewart et al. .................. 322/89 |

FOREIGN PATENT DOCUMENTS

| DE | 10209054 | 9/2002 |
|---|---|---|
| EP | 0707372 | 4/1996 |
| FR | 2248641 | 5/1975 |
| FR | 2510319 | 1/1983 |

\* cited by examiner

*Primary Examiner* — Julio Gonzalez Ramirez
(74) *Attorney, Agent, or Firm* — Berenato & White, LLC

(57) ABSTRACT

An electrical supply device includes a set of armature coils which are coupled together in a polygonal mode. The coils are connected to a single bridge rectifier which includes a set of controllable elements allowing switching between a first operating mode in which some of the coils are electrically connected in series and a second operating mode in which all of the coils are electrically connected in parallel. An alternator for a motor vehicle includes the disclosed supply device.

4 Claims, 4 Drawing Sheets

POWER SUPPLY DEVICE FOR MOTOR VEHICLE ALTERNATOR AND ALTERNATOR EMPLOYING SUCH DEVICE

FIELD OF THE INVENTION

This invention relates to the field of motor vehicle alternators and more particularly a power supply device and the operating modes which are associated with it for such alternators. It also extends to an alternator comprising such a power supply device and employing such operating modes.

BACKGROUND OF THE INVENTION

In a conventional manner, an alternator fitted to a motor vehicle comprises a stator in which is placed a rotor, a shaft of which is rotationally driven by the vehicle's internal combustion engine by means of an appropriate device. In a manner which is also conventional, the stator comprises at least two armature windings connected to a rectification device to form two power supply sources.

As a result of the method of driving the rotor, the performance of such an alternator varies with the speed of the internal combustion engine. However, the vehicle's own systems need a power supply of constant voltage.

In order to remedy this drawback, it is known, in particular, for two independent three-phase windings to be made at the stator and for an electronic circuit to be added, connecting the said windings, making it possible, depending on the speed of the vehicle's internal combustion engine, to connect the said windings in series or in parallel. More precisely, the said connecting electronic circuit makes a series connection of the said windings when the engine speed is low in order to obtain a high off-load voltage and high current at low speed at the alternator output and a parallel connection in the case of high speed of the said internal combustion engine, in order to increase the current delivered by the said alternator.

In a known manner, each of the three-phase windings is associated with a diode rectification device and several solutions are known in the prior art for making the above-mentioned connecting electronic circuit. For example, document FR2807232 proposes associating each of the diode rectification devices of the two three-phase windings with an auxiliary bridge rectifier also made up of diodes and connecting the said auxiliary bridge rectifiers by switchable means such as, but without being restricted to, a transistor, controlled diode or a switch. Document U.S. Pat. No. 6,005,786, for its part, proposes placing the following directly at the outputs of the two three-phase windings, each associated with its rectification device: a set of switchable means with which it is possible to interconnect some of the outputs of the said windings, depending on the number and nature of the switchable means activated.

Even if, with these coupling modes, it is possible to obtain satisfactory alternator performance, the said coupling modes nevertheless involve the use of a relatively large number of electronic components, which increases the alternator's overall dimension. As, on a motor vehicle, the alternator is located in a restricted space, the constraints linked with its overall dimension also involve the said electronic components' being relatively close to one another. As a result, it is then necessary to add a set of means with which the thermal dissipation of the calories emitted during operation can take place (fans, liquid circulation cooling devices, etc.), which increases the complexity of the alternator and therefore its cost.

The aim of this invention is to propose a rectification device for an alternator intended for a motor vehicle, in which the number of electronic components is small, whereby the overall dimension of the said alternator can be reduced, while high performance is retained in terms of voltage and current delivered, irrespective of the speed of the vehicle's internal combustion engine.

With this aim, the principal object of this invention is a power supply device, particularly for a motor vehicle's own system, that comprises a set of armature coils assembled in a polygonal coupling mode, i.e. connected to one another in hexagonal coupling so as to form a polygon. Moreover, the armature coils are connected to a single bridge rectifier comprising a set of controllable elements with which switching can be carried out between a first operating mode in which some of the armature coils are electrically connected in series, and a second operating mode in which all of the armature coils are electrically connected in parallel.

SUMMARY OF THE INVENTION

According to a preferred embodiment of the invention, the power supply device comprises six armature coils, assembled in hexagonal coupling. In the following, the invention will be preferentially described according to this preferred but not exclusive embodiment.

In this preferred embodiment, according to a feature of the invention, the controllable elements of the rectification device are made up of a set of six thyristors and are placed at the terminals of the armature coils alternately with a set of diodes. More precisely, according to an advantageous embodiment of the invention, one of the terminals of each of the armature coils is connected to a set of two thyristors, the other terminal being connected to a set of two diodes.

According to another feature of the invention, the terminal of each of the armature coils connected to the two thyristors is connected to the anode of one of them, then named a positive thyristor (or positive controllable element) and to the cathode of the other one, therefore named a negative thyristor (or negative controllable element). The same applies to the above-mentioned sets of two diodes, each of which is thus formed from a so-called positive diode as it is connected through its anode to the armature coil and from a so-called negative diode as it is connected through its cathode to the armature coil.

Advantageously, the anodes of the various different so-called negative rectification elements are connected to earth and the cathodes of the various different so-called positive rectification elements are connected to the power supply line of the motor vehicle's own system.

It follows from the foregoing that, when the switchable elements (here, the thyristors) are not activated, the armature coils are connected in series, two by two. Taking into account the existing time phase shift of 120 degrees, due to the hexagonal coupling, between two consecutive coils, the set therefore delivers an electromotive force equal to the electromotive force delivered by one of the coils multiplied by a factor equal to the square root of three. In the event that the armature coils are made up of N turns, everything therefore happens as if the said coils comprised a greater number of turns; more precisely, the power supply device according to the invention behaves as if its armature coils were formed from N×√3 turns. Consequently, the power delivered by the power supply device according to the invention is greater than the power which the same device would deliver if the armature coils which form it comprised N turns. In the context of the application of the invention to making an alternator for a motor vehicle, this situation will be sought for the low speeds of internal combustion engine operation, speeds for which, with the invention, it will be possible to obtain a greater current for low rotor rotation speeds.

Conversely, when the switchable elements (here, the thyristors) are activated, the armature coils of the power supply device according to the invention are electrically connected in parallel; with this, it is possible to increase the total current delivered. In the context of the application of the invention to making an alternator for a motor vehicle, this situation will be rather sought for the high speeds of internal combustion engine operation, speeds for which, with the invention, it will be possible to obtain a greater current at the alternator output.

With the invention, due to the polygonal coupling of the armature coils and the putting in place of controllable rectification elements such as thyristors, it is possible to make a simple power supply device with which there can be rapid switching between a state in which it delivers a high voltage and a state in which it delivers a high current, while employing a single rectification device made up of a smaller number of elements than the rectification devices conventionally used for achieving the same aim.

With the invention, applied to the field of alternators for motor vehicles, it is therefore possible, through the reduction in the number of components necessary for rectification, to reduce the overall dimension of the alternator obtained, while having at one's disposal a system having high performance through the switching between the "series" state and the "parallel" state of the armature coils. With this, it is also possible to reduce the number of turns forming the said armature coils, while maintaining a high level of performance, irrespective of the engine operating speeds.

With this, it is also possible, through the reduction in the number of rectification components, to simplify the thermal dissipation device associated with these and finally it is possible, due to the simplicity of operation of its rectification device, to use lower-cost standard components.

In the final analysis, with the invention, it is therefore possible to make an alternator which is more compact, simpler and therefore less expensive than the alternators known in the prior art, yet having performance at least as high as these latter and even—particularly for the vehicle engine's low speeds higher than these.

It is to be noted that the number of controllable elements of the rectification device is not limited to the number which has just been mentioned and that, depending on variants, this number can, in particular, be smaller, as will be explained below. Similarly, the arrangement described above for the said rectification elements is not exclusive, as will also be set out below.

BRIEF DESCRIPTION OF THE DRAWINGS

Other features and advantages of the invention will appear when the following description is read, with reference to the following illustrations in which.

DETAILED DESCRIPTION

Figure 1:
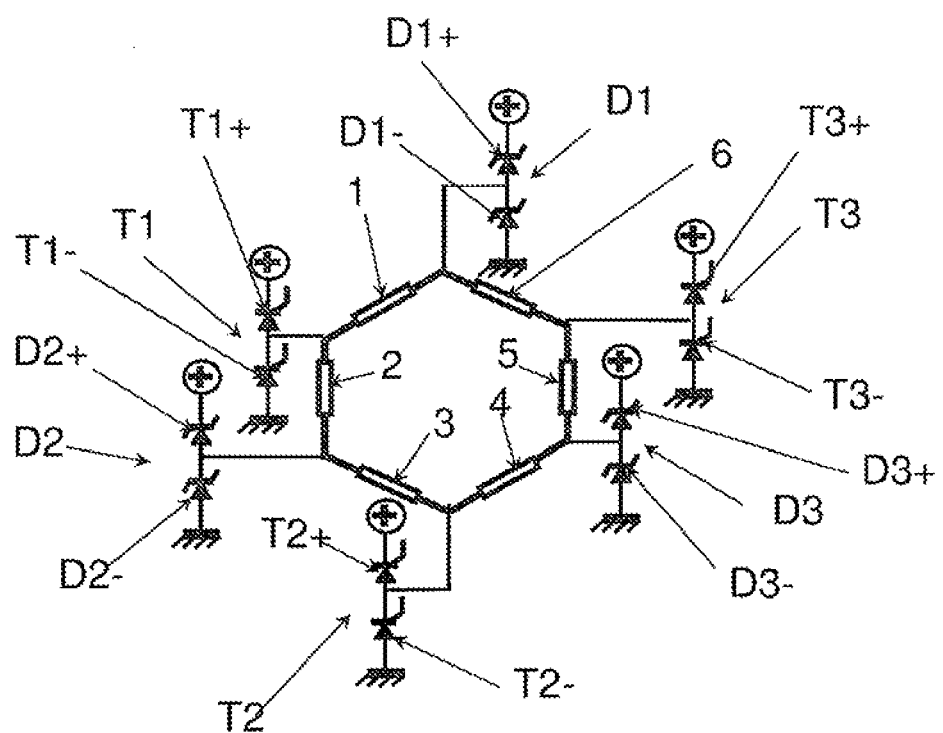
FIG. 1 is a schematic representation of a preferred embodiment of a power supply device according to the invention.

According to the preferred embodiment of the present invention shown in FIG. 1 and referred to above, a power supply device according to the present invention comprises a set of six armature coils numbered 1 to 6 and connected to one another in hexagonal coupling, i.e. assembled in a hexagonal coupling mode, so as to form a hexagon. An output terminal of the armature coil 1 is thus connected to an input terminal of coil 2, the output terminal of which is connected to the input terminal of coil 3 and so on, the output terminal of the armature coil 6 being connected to an input terminal of the armature coil 1. Each of the armature coils 1 to 6 comprises N turns, wherein each of the N turns is formed, in a known manner, from any number of conducting wires.

According to the present invention, the set formed by the armature coils 1 to 6 is associated with a single rectification device comprising a set of controllable elements.

According to the preferred embodiment of the invention shown in FIG. 1, the rectification device comprises a set of thyristors T1+-T3−, forming the set of controllable elements, and a set of diodes D1+-D3−, the number and arrangement of which will now be described.

Figure 5:
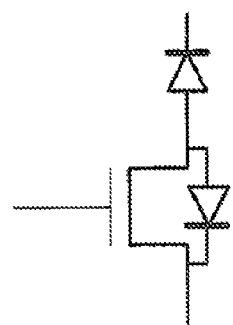
FIG. 4 is a perspective schematic view of the rear part of an alternator employing a power supply device according to the invention and FIG. 5 shows a controllable element with MOSFET transistors.

Alternatively, the controllable elements can be formed from or comprise transistor switching elements, particularly of the MOSFET type, as shown in FIG. 5. These transistor switching elements can advantageously replace thyristors T1+-T3− in some applications of the present invention.

As shown in FIG. 1, there are six thyristors T1+-T3−, grouped in pairs T1, T2 and 13. The same applies to the diodes D1+-D3−, of which there are also six, grouped in pairs D1, D2 and D3. According to the non-limiting, preferred embodiment of the invention shown in FIG. 1, the diodes of the pairs D1, D2 and D3 are Zener diodes in order to ensure the system protection function.

According to the invention, the pairs of thyristors T1-T3 and pairs of diodes D1-D3 are placed alternately at the terminals of the armature coils 1 to 6, as FIG. 1 shows. Thus, each of the armature coils 1 to 6 is connected, through one of its terminals, to one of the pairs of thyristors T1-T3 and, through its other terminal, to one of the pairs of diodes D1-D3.

More precisely, with reference to the armature coil 1 for example, the terminal of the armature coil 1, connected to the pair of thyristors T1, is connected, on one hand, to an anode of one of the pair of thyristors T1, consequently named a positive thyristor (or positive controllable element) and referenced T1+ in FIG. 1, and, on the other hand, to a cathode of the other thyristor of the pair T1, consequently named a negative thyristor (or negative controllable element) and referenced T1− in FIG. 1. The same applies to the pair of diodes D1 connected to the other terminal of the armature coil 1. The terminal of the armature coil 1 is thus connected to an anode of the pair of diodes D1 or positive diode designated by the reference D1+, and to a cathode of the pair of diodes D1 or negative diode designated by the reference D1−.

The same is true for each of the armature coils 1-6 of the set of armature coils 1 to 6. The rectification device of the power supply device according to the present invention is thus made up of two sub-sets of so-called "positive" or "negative" controllable elements, or components, as they are connected through their anodes or through their cathodes, respectively, to the terminals of the armature coils 1-6.

Advantageously and as FIG. 1 shows, the anodes of the controllable elements T1−, T2− and T3− of the "negative" sub-set are connected to earth and the cathodes of the controllable elements T1+, T2+ and T3+ of the "positive" sub-set are connected to a power supply line, for example the power supply line of a system of a motor vehicle.

When the thyristors T1, T2 and T3 are not activated, the armature coils 1 and 2 are electrically connected in series, as well as the armature coils 3 and 4 and the armature coils 5 and 6. Consequently, the electromotive force generated by the power supply device according to the invention is equal to the vector sum of the electromotive force generated by each of the armature coils connected in series. As the armature coils are successively shifted, two by two, by 120 degrees due to the hexagonal coupling thereof, the total electromotive force generated by the power supply device according to the invention is equal to the electromotive force generated by one of the armature coils, multiplied by a factor equal to the square root of three. If each of the armature coils is, as has been stated above, made up of the N turns, the performance of the power supply device according to the present invention will therefore be equal to that of a conventional device made up of coils formed from N times the square root of three turns (N×√3).

With equal performance, by means of the device according to the invention, it is possible to reduce the number of turns per coil and thus to increase the power of the machine with equal volume.

When the thyristors of the pairs T1, T2 and T3 are activated, the coils 1 to 6 are electrically connected in parallel. Consequently, the electromotive force generated by the device according to the invention is equal to that generated by each coil and the current delivered by the said device is increased. The performance of the device according to the invention is, here, that of a device formed from coils of N turns placed in parallel.

Figure 2:
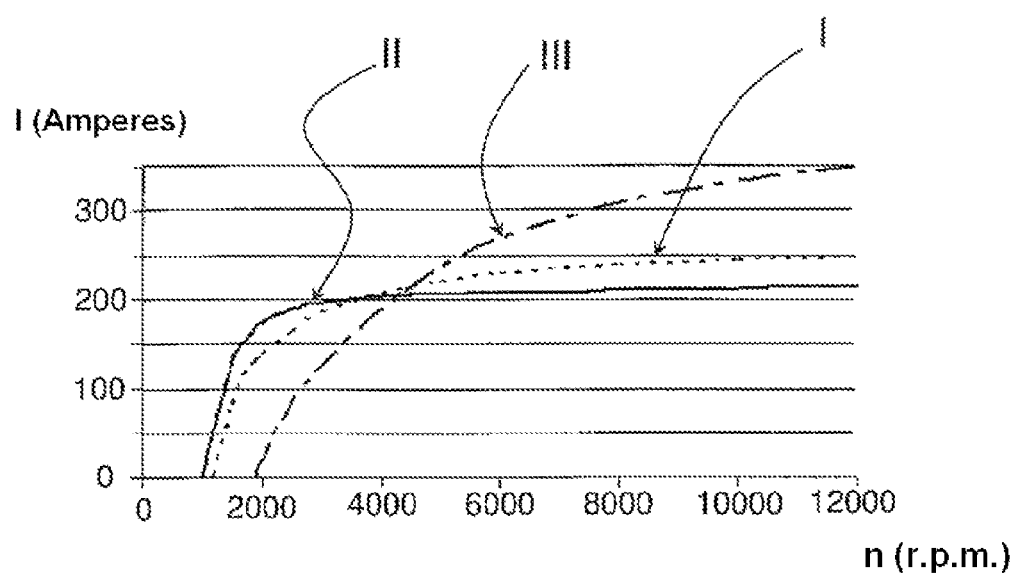
FIG. 2 is a curve showing, as a function of the speed of a motor vehicle's internal combustion engine, the current delivered by an alternator comprising a power supply device according to the invention.

These phenomena are illustrated in FIG. 2, which shows the current delivered by an alternator as a function of the number of revolutions per minute of the internal combustion engine to which it is fitted.

Curve I, in a broken line, shows the current delivered by an alternator as conventionally known in the prior art, comprising two three-phase windings of six turns each, connected in series by means of one of the devices referred to at the beginning of this document. Curves II and III, in an unbroken line and in a dot-and-dash line respectively, show the performance of an alternator comprising the power supply device according to the present invention, the coils of which comprise 5 turns, in its different operating modes.

More precisely, curve II shows the current delivered by means of the power supply device according to the invention when the pairs of thyristors T1, T2 and T3 are not activated, i.e. when the armature coils 1 and 2, 3 and 4, and 5 and 6, respectively, are electrically connected in series, two by two. FIG. 2 clearly shows that, at low engine speed, the performance of the power supply device according to the present invention is higher than that of the device in which the windings comprise 6 turns. It is even to be noted that, at around 2,000 revolutions per minute, which corresponds to the engine idle speed, the current delivered by the alternator equipped with the power supply device according to the present invention is greater than that supplied by the device in which the windings comprise 6 turns.

Therefore, with the invention, it is possible, in the case of low engine speeds, to make an alternator having performance which is at least equal to or even higher than that of a device in which the windings comprise a greater number of turns.

Curve III, in a dot-and-dash line in FIG. 2, shows the current delivered by means of a device according to the invention when the pairs of thyristors T1, T2 and T3 are activated. As has been explained above, the coils 1 to 6 are then electrically connected in parallel. Consequently, there is an appreciable increase in the current delivered by the alternator fitted with such a device. This is particularly visible in FIG. 2, in the case of high engine speeds, in comparison with the current delivered by the conventional alternator, the characteristic curve of which is shown by curve I.

With the device according to the invention, it is thus possible to obtain—by simple activation of the three pairs of thyristors T1, T2 and T3− two operating modes, due to which the alternator of a motor vehicle comprising the said device has high performance, for a reduced number of coil turns.

The weight of such an alternator can thus be reduced, which proportionately reduces its energy cost on the vehicle. Similarly, the rectification set—single and formed from only 6 thyristors and 6 diodes—is simplified due to the device according to the invention, in comparison with the bridge rectifiers used at present. Consequently, the overall dimension of an alternator comprising the device according to the invention can be reduced further and the compactness of the said alternator can, moreover, also be increased by means of a simplification of the device for thermal dissipation of the calories emitted by the components of the rectification set, these being fewer in comparison with the alternators known at present.

Figure 4:
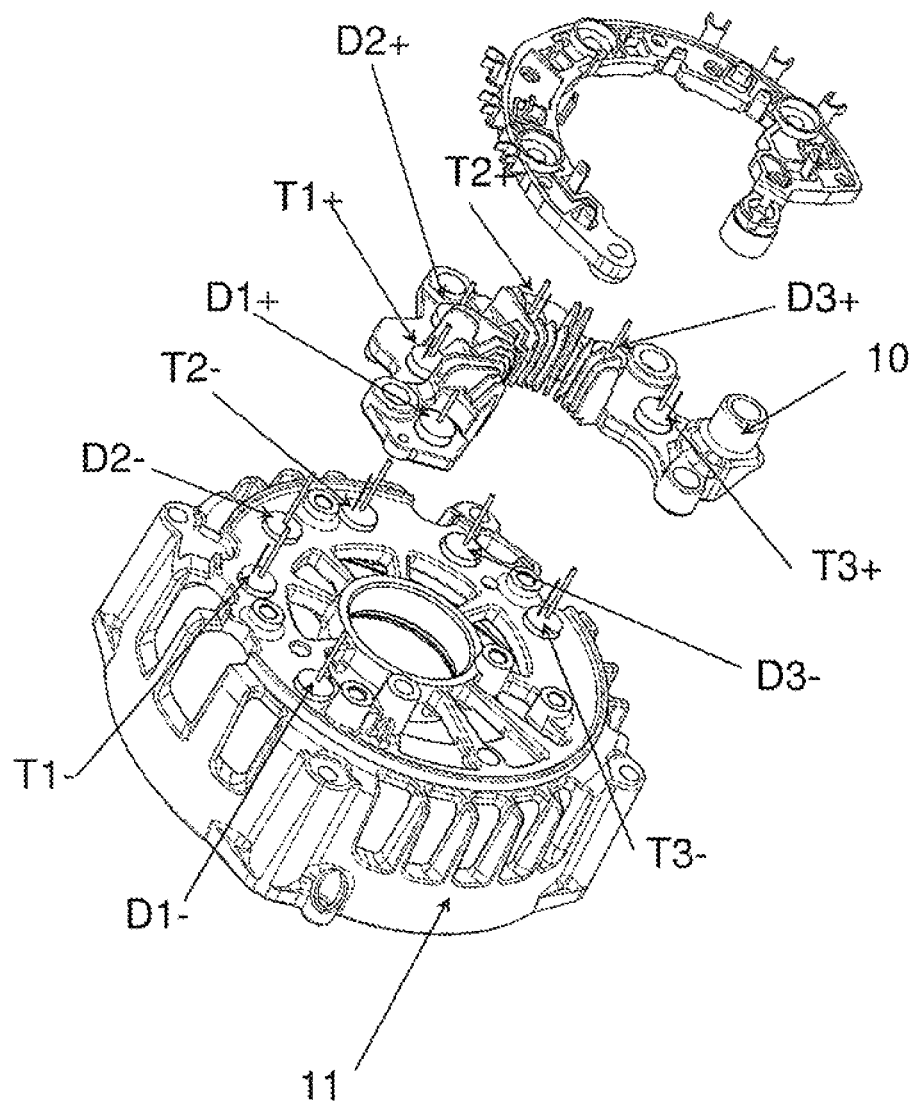

FIG. 4 shows an alternator comprising the power supply device according to the present invention.

FIG. 4 shows a positive dissipater 10 and a negative dissipater 11 of an alternator as known in the prior art, on which are conventionally placed the rectifier diode bridges at the locations referenced by D+ and D− respectively.

In an alternator employing the device according to the invention in its preferred embodiment described above, the thyristors T1+, T2+ and T3+ take the place of three of the diodes D+ and the thyristors T1−, T2− and T3− take the place of three of the diodes D−. Therefore, thyristors and diodes adjoin on the positive and negative dissipaters and—due to the absence of any complementary connection electronic circuit—the compactness of the set can be improved.

It is to be noted that the invention is not limited to the embodiment which has just been described and that it extends, in particular, to any variant, in particular any variant employing equivalent means or any technically operating combination of these.

Figure 3:
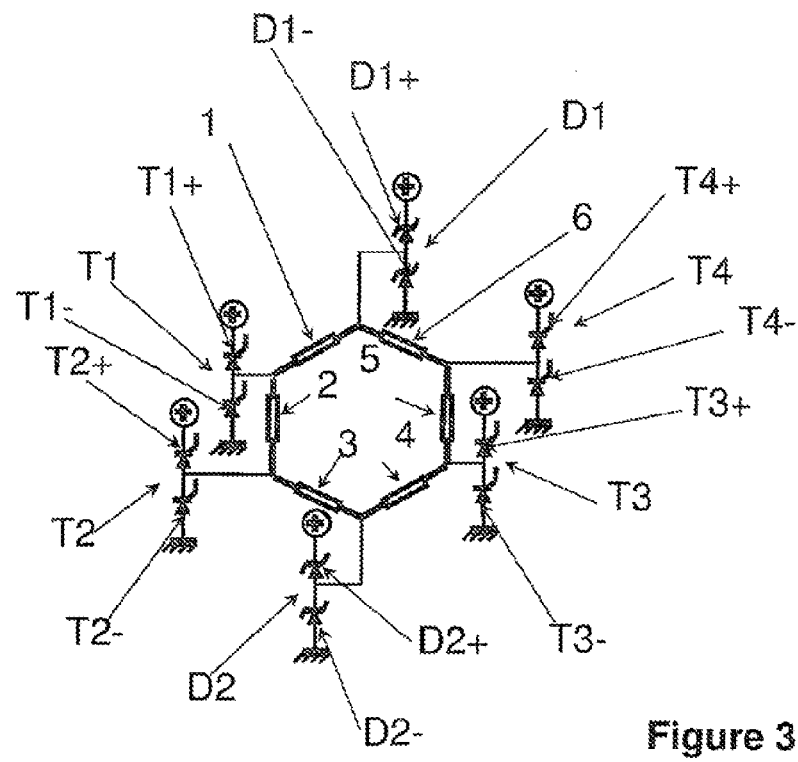
FIG. 3 is a schematic representation of an alternative embodiment of the invention.

Thus, for example, the number of pairs of thyristors, established at three in the embodiment which has just been described, can be established at four in an alternative embodiment of the invention, shown in FIG. 3.

According to this alternative embodiment, four pairs of thyristors T1, T2, T3 and T4, are placed at the terminals of coils 1 to 6, alternating with two pairs of diodes D1 and D2.

More precisely, coil 1 is connected, through one of its terminals, to a pair of thyristors T1 and, through its other terminal, to a pair of diodes D2. Coil 2 is, for its part, connected through one of its terminals to the said pair of diodes D2 and, through its other terminal, to a pair of thyristors T2. Coil 3 is connected through each of its terminals to two pairs of thyristors, T2 and T3 respectively, whereas coil 4 is connected, through one of its terminals, to the said thyristors T3 and, through its other terminal, to the second pair of diodes D2. Coil 5 is then connected to the said diodes D2 and to the thyristors T4 respectively, coil 6 being connected to the said thyristors T4 and to the thyristors T1 mentioned above.

When the thyristors T1, T2, T3 and T4 are not activated, coils 2, 3 and 4 on one hand and 5, 6 and 1 on the other hand are electrically connected in series. In a manner similar to that which has been referred to above, this will lead, for a given number of turns in coils 1 to 6, to an increase in the current delivered by an alternator comprising such a device, in particular at low engine speeds of the vehicle concerned. When the thyristors T1, T2, T3 and T4 are activated, coils 1 to 6 are electrically connected in parallel as above.

Therefore, due to the invention, it is possible to make a power supply device and vehicle alternator which are simple and compact and less expensive than the devices and alternators known at present, while maintaining high levels of performance.

It is also to be noted that if, according to the embodiments of the invention shown in the illustrations, diodes D1, D2 and D3 are Zener diodes, the latter can be replaced with standard diodes—costing less—and perform the system protection function through an external device.

Finally, it is to be clearly stated that, to respond to specific operating constraints, it is possible to consider making the device according to the invention by using eight, ten or twelve coils assembled in octagonal, decagonal or dodecagonal coupling modes respectively. In these cases, according to preferred embodiments of the invention, the controllable elements of the rectification device will advantageously comprise four, five or six pairs of thyristors placed alternating with the same number of pairs of diodes at the terminals of the said coils, in order to obtain an operating mode in which the said coils will be electrically connected in series, two by two.

The invention claimed is:

1. A power supply device for a system of a motor vehicle, comprising:
    a set of armature coils assembled in a polygonal coupling mode such that an output terminal of each one of the armature coils being connected to an input terminal of a single adjacent one of the armature coils so as to form a polygon; and
    a single bridge rectifier connected to the set of armature coils and comprising a set of controllable elements carrying out switching between a first operating mode in which some of the armature coils are electrically connected in series and a second operating mode in which all of the armature coils are electrically connected in parallel;
    the controllable elements comprising thyristors, the thyristors being assembled in three pairs (T1, T2 and T3) connected to terminals of the coils (1, 2, 3, 4, 5 and 6) alternating with three pairs of diodes (D1, D2 and D3), in such a way that, in the absence of activation of the thyristors (T1, T2 and T3), the coils are electrically connected in series, two by two.

2. The device according to claim 1, wherein each of the coils (1, 2, 3, 4, 5 and 6) is connected, through one of the terminals thereof, to the anode of one of the diodes of the pairs of diodes (D1, D2 and D3) and to the cathode of the other diode of the pair (D1, D2 and D3) respectively and—through the other terminal thereof—to the anode of one of the thyristors of one of the pairs of thyristors (T1, T2 and T3) and to the cathode of the other thyristor of the pair (T1, T2 and T3) respectively, the anodes of the thyristors or diodes connected through their cathodes to the coils being connected to earth and the cathodes of the thyristors and diodes connected through their anodes to the coils being connected to the power supply line of the system of the motor vehicle.

3. A power supply device for a system of a motor vehicle, comprising:
    a set of armature coils assembled in a polygonal coupling mode such that an output terminal of each one of the armature coils being connected to an input terminal of a single adjacent one of the armature coils so as to form a polygon; and
    a single bridge rectifier connected to the set of armature coils and comprising a set of controllable elements carrying out switching between a first operating mode in which some of the armature coils are electrically connected in series and a second operating mode in which all of the armature coils are electrically connected in parallel;
    the controllable elements comprising thyristors assembled in four pairs (T1, T2, T3 and T4); and
    the device further comprising diodes assembled in two pairs (D1 and D2);
    the thyristors (T1, T2, T3 and T4) and the diodes (D1 and D2) being connected to the terminals of the coils (1, 2, 3, 4, 5 and 6) in such a way that, in the absence of activation of the thyristors, the coils are electrically connected in series, three by three.

4. An alternator for a motor vehicle, comprising a power supply device comprising:
    a set of armature coils assembled in a polygonal coupling mode so as to form a polygon;
    a single bridge rectifier connected to the armature coils and comprising a set of controllable elements carrying out switching between a first operating mode in which some of the armature coils are electrically connected in series and a second operating mode in which all of the armature coils are electrically connected in parallel;
    a positive dissipater connected to a power supply line of the motor vehicle, and
    a negative dissipater connected to the vehicle's earth;
    the set of controllable elements comprises positive and negative controllable elements;
    the positive controllable elements, connected through anodes thereof to armature coil terminals, being placed on the positive dissipater; and
    the negative controllable elements, connected through cathodes thereof to the armature coil terminals, being placed on the negative dissipater.

* * * * *